United States Patent
Headings et al.

(10) Patent No.: US 11,512,798 B2
(45) Date of Patent: Nov. 29, 2022

(54) MECHANICALLY LOCKING END SCREW ARRANGEMENTS

(71) Applicant: Swagelok Company, Solon, OH (US)

(72) Inventors: Robert Scott Headings, Chesterland, OH (US); Mark Clason, Orwell, OH (US); Erick R. Shelley, Lyndhurst, OH (US); Alexandra M. Fort, Lyndhurst, OH (US)

(73) Assignee: Swagelok Company, Solon, OH (US)

( * ) Notice: Subject to any disclaimer, the term of this patent is extended or adjusted under 35 U.S.C. 154(b) by 166 days.

(21) Appl. No.: 16/665,009

(22) Filed: Oct. 28, 2019

(65) Prior Publication Data

US 2020/0141521 A1 May 7, 2020

Related U.S. Application Data

(60) Provisional application No. 62/755,715, filed on Nov. 5, 2018.

(51) Int. Cl.
*F16L 13/16* (2006.01)
(52) U.S. Cl.
CPC ................... *F16L 13/168* (2013.01)
(58) Field of Classification Search
CPC ..... F16L 13/141; F16L 13/168; F16L 13/163; F16L 19/005
See application file for complete search history.

(56) References Cited

U.S. PATENT DOCUMENTS

| | | | | |
|---|---|---|---|---|
| 1,069,916 | A | * | 8/1913 | Windsor ............... F16L 37/252 285/81 |
| 2,943,871 | A | | 7/1960 | St. Clair |
| 3,522,830 | A | * | 8/1970 | Blizard ................. F16B 39/34 411/303 |

(Continued)

FOREIGN PATENT DOCUMENTS

| | | |
|---|---|---|
| CN | 104565634 A | 4/2015 |
| CN | 104016381 | 5/2016 |

(Continued)

OTHER PUBLICATIONS

TNC Straight Bulkhead Jack Crimp for RG 174 or RG 316, 9 pgs., accessed Feb. 4, 2021, copyright 2021.

(Continued)

*Primary Examiner* — Zachary T Dragicevich
*Assistant Examiner* — Alexander T Rufrano
(74) *Attorney, Agent, or Firm* — Calfee, Halter & Griswold LLP

(57) ABSTRACT

A fluid control assembly includes a body having a female threaded end port, and an end adapter including a male threaded end screw threadably assembled with the female threaded end port, an end connector, and an internal passage extending from the end connector to the end screw. One of the body and the end adapter includes at least one outer peripheral recess, and the other of the body and the end adapter includes a peripheral flange. A portion of the peripheral flange in circumferential alignment with the at least one recess is deformed into interlocking engagement with the at least one recess to rotationally secure the end adapter with respect to the body.

16 Claims, 5 Drawing Sheets

(56) References Cited

U.S. PATENT DOCUMENTS

| | | | | |
|---|---|---|---|---|
| 4,793,754 A * | 12/1988 | Nobileau | ............... | E21B 17/085 411/186 |
| 4,812,094 A * | 3/1989 | Grube | ..................... | F16B 39/10 301/124.1 |
| 5,058,930 A | 10/1991 | Schlosser | | |
| 5,083,819 A | 1/1992 | Bynum | | |
| 5,215,336 A * | 6/1993 | Worthing | ............... | F16L 19/005 285/319 |
| 5,393,104 A * | 2/1995 | Zornow | ............... | B26D 7/2628 285/251 |
| 5,573,311 A * | 11/1996 | Clohessy | .............. | F16C 35/063 301/124.1 |
| 5,606,753 A * | 3/1997 | Hashimoto | ............. | F16B 39/32 411/7 |
| 5,823,702 A * | 10/1998 | Bynum | ................. | F16L 19/005 285/82 |
| 6,860,688 B2 * | 3/2005 | Bushell | ................. | F16B 39/105 411/196 |
| 6,976,816 B2 * | 12/2005 | Slesinski | ............... | F16B 39/108 411/122 |
| 7,063,565 B2 | 6/2006 | Ward | | |
| 7,183,486 B2 | 2/2007 | Pyron et al. | | |
| 7,883,117 B2 * | 2/2011 | Marc | ..................... | F16L 19/005 285/86 |
| 7,927,052 B1 * | 4/2011 | Varden | ................. | F16B 39/108 411/197 |
| 8,062,044 B2 | 11/2011 | Montena et al. | | |
| 8,568,165 B2 | 10/2013 | Wei et al. | | |
| 8,695,218 B2 | 4/2014 | Scartozzi | | |
| 8,920,192 B2 | 12/2014 | Montena | | |
| 10,411,393 B2 | 9/2019 | Rodrigues et al. | | |
| 10,714,847 B2 | 7/2020 | Youtsey | | |
| 2012/0038145 A1 * | 2/2012 | Ramos | ................... | F16L 23/003 285/80 |
| 2013/0280006 A1 | 10/2013 | Desantis et al. | | |
| 2019/0170281 A1 | 6/2019 | Lang et al. | | |
| 2020/0003345 A1 | 1/2020 | Trivett et al. | | |
| 2020/0059050 A1 | 2/2020 | Meshram | | |

FOREIGN PATENT DOCUMENTS

| | | | | |
|---|---|---|---|---|
| CN | 105680263 | | 6/2016 | |
| FR | 2538471 | | 6/1984 | |
| GB | 1205266 A | | 9/1970 | |
| WO | 2019/111023 | | 6/2019 | |
| WO | WO-2019111023 A1 * | | 6/2019 | ......... F16L 33/2076 |

OTHER PUBLICATIONS

Parker, Assembly/Installation, Catalog 4300, dated Oct. 2017, 40 pgs.

International Search Report and Written Opinion from PCT/US19/058247 dated Apr. 15, 2020.

Office action from Chinese Application No. 201980072493.0 dated Jul. 20, 2022.

* cited by examiner

MECHANICALLY LOCKING END SCREW ARRANGEMENTS

CROSS-REFERENCE TO RELATED APPLICATION

This application claims priority to and all benefit of U.S. Provisional Patent Application Ser. No. 62/755,715, filed on Nov. 5, 2018 and entitled MECHANICALLY LOCKING END SCREW ARRANGEMENTS, the entire disclosure of which is incorporated herein by reference.

BACKGROUND OF THE DISCLOSURE

The inventions relate to fluid system components utilizing threaded end screw type end adapters.

SUMMARY OF THE DISCLOSURE

In an exemplary embodiment of the present disclosure, a fluid control assembly includes a body having a female threaded end port, and an end adapter including a male threaded end screw threadably assembled with the female threaded end port, an end connector, and an internal passage extending from the end connector to the end screw. One of the body and the end adapter includes at least one outer peripheral recess, and the other of the body and the end adapter includes a peripheral flange. A portion of the peripheral flange in circumferential alignment with the at least one recess is deformed into interlocking engagement with the at least one recess to rotationally secure the end adapter with respect to the body.

In another exemplary embodiment, a method of making a mechanically locked threaded connection is contemplated. In an exemplary method, a body and an end adapter are provided, with the body including a female threaded end port and the end adapter including a male threaded end screw and an end connector. One of the body and the end adapter includes at least one outer peripheral recess, and the other of the body and the end adapter includes a peripheral flange. The male threaded end screw is threadably assembled with the female threaded end port, and a portion of the peripheral flange is deformed into interlocking engagement with the at least one outer peripheral recess to rotationally secure the end adapter with respect to the body These and other inventive concepts and embodiments are fully described hereinbelow and will be readily understood by those skilled in the art from the following detailed description of the exemplary embodiments in view of the accompanying drawings.

DESCRIPTION OF THE EXEMPLARY EMBODIMENTS

Figure 1:
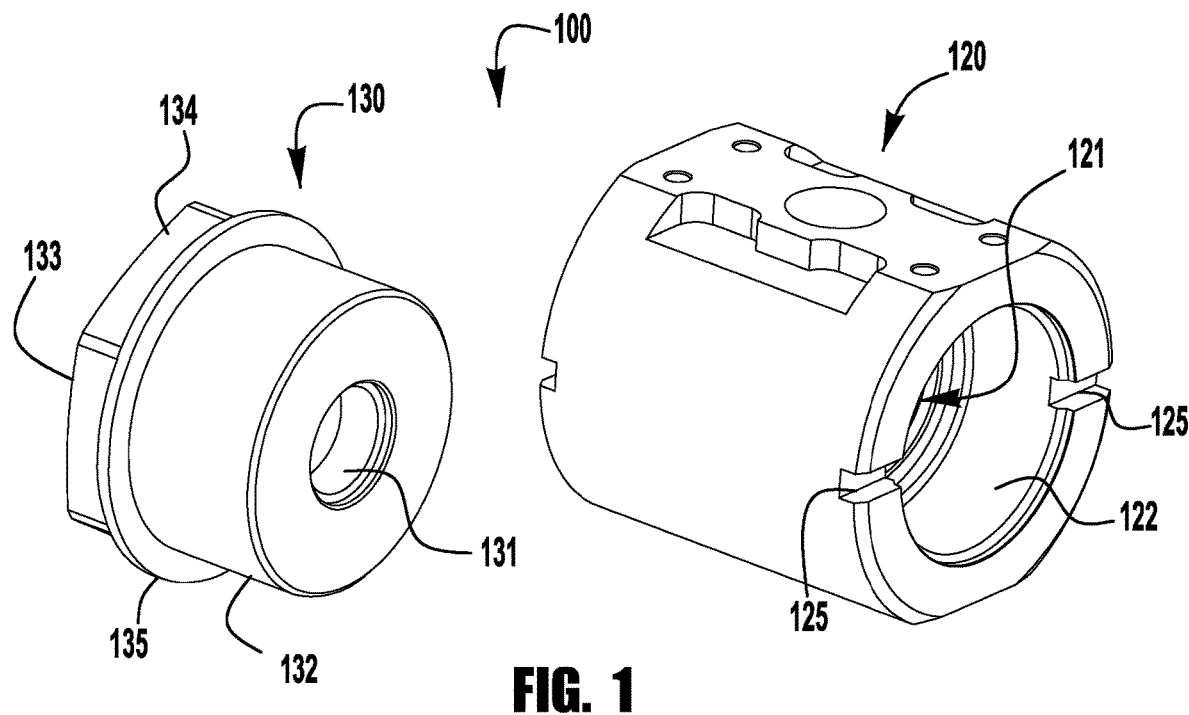
FIG. 1 is an exploded perspective view of a body and end adapter of a fluid device assembly, according to an exemplary embodiment of the present disclosure.

While exemplary embodiments described herein are directed to a shutoff ball valve with threaded end screw type end adapters, the inventive features described may be used in a variety of fluid devices, including, for example, other types of valves (e.g., needle valves, gate valve, bellows valves, diaphragm valves, check valves), fittings, filters, regulators, and sample cylinders.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Fluid devices, such as shutoff valves, are commonly provided with at least two end connections for installing the fluid device into a fluid system. While the end connections may be integrally formed with the body of the fluid device, separate end adapters assembled with the fluid device body allow for adaptability of the fluid device for use in different sized fluid systems or with different types of connections (e.g., threaded connections, weld end connections, gasketed connections, tube fitting connections). In one such arrangement, a fluid device body includes female threaded ports sized to be assembled with male threaded portions (or "end screws") of end screw type end adapters. Such an arrangement may eliminate the need for separate fasteners or welding operations, facilitating quick and adaptable device assembly.

In some embodiments, subsequent loosening or disassembly of an installed end screw type end adapter may not be desirable, particularly where the fluid device is installed in a fluid system involving high pressure, high temperature, or corrosive/toxic fluid conditions. In embodiments in which a fluid device end adapter includes a threaded end connection, efforts to unthread the end connection from the fluid system may inadvertently loosen the end screw from the fluid device body. Other conditions may also result in inadvertent or undesirable loosening, including for example, system vibrations or fluid device tampering.

According to an aspect of the present disclosure, a threaded end adapter may be mechanically locked with a fluid device body by crimping, peening, or otherwise deforming a portion of one of the end adapter and the body into a recessed portion of the other of the end adapter and the body after full threaded assembly of the end adapter with the body, such that rotation of the end adapter with respect to the body is prevented (e.g., in the loosening and/or tightening directions). As one example, one of the end adapter and the body may include a deformable peripheral wall or flange, and the other of the end adapter and the body may include at least one recess disposed on a portion of its outer periphery. When the end adapter is tightened with the body to a desired condition (e.g., desired torque, number of turns, and/or rotational orientation), a portion of the wall/flange that is circumferentially aligned with the at least one recess may be crimped, peened, or otherwise deformed into mating or interlocking engagement with the aligned recess, thereby securing the end adapter in the desired condition.

Figure 2:
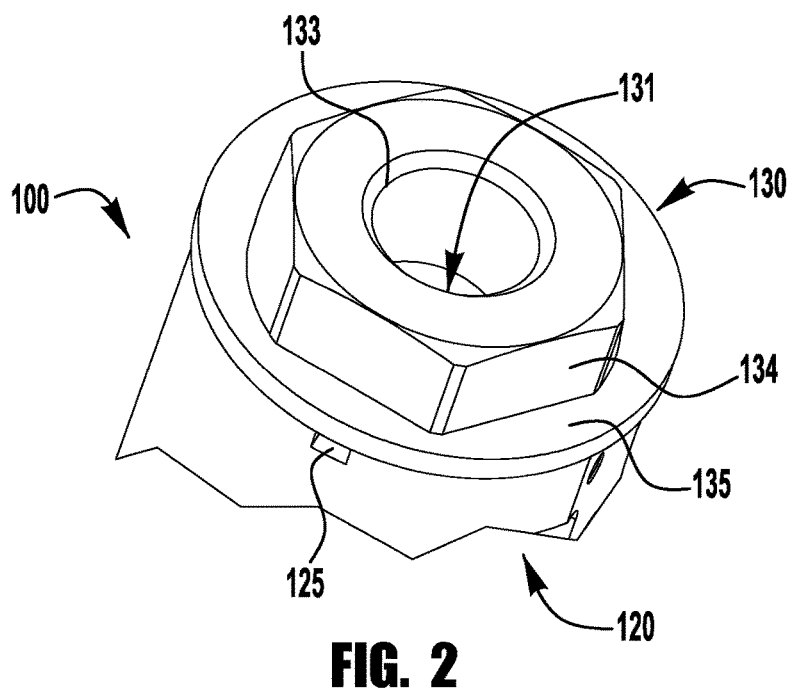
FIG. 2 is a perspective view of the assembly of FIG. 1, shown in a fully assembled condition.
Figure 3:
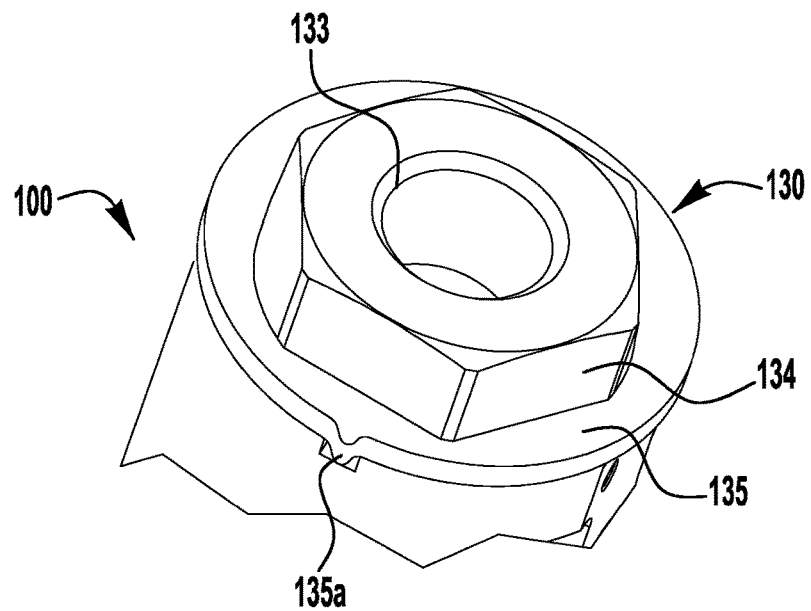
FIG. 3 is a perspective view of the assembly of FIG. 1, shown in a fully assembled and mechanically locked condition.

FIGS. 1-3 illustrates an exemplary assembly 100 including a body 120 and an end adapter 130. The body 120 includes an internal cavity 121 and a female threaded end port 122. The end adapter 130 includes a male threaded end screw 132, an end connector 133, and an internal passage 131 extending from the end screw 132 to the end connector 133. The end connector 133 may include a variety of end connections including, for example, male or female pipe threads, tube fitting, weld end, or gasketed connection. As shown, the end adapter 130 may be provided with an external hex-shaped portion 134 to facilitate tightening with a wrench or other tool. In other embodiments, other features may be used to facilitate tightening (e.g., holes for a spanner wrench).

The body 120 includes two axially extending recesses or notches 125 on an outer periphery of the end port 122, and the end adapter 130 includes a radially extending peripheral flange 135 that approaches or abuts the end port outer periphery when the end adapter 130 is assembled with the body 120 (FIG. 2). When the end adapter 130 is tightened with the body 120 to a desired condition (e.g., desired torque, number of turns, and/or rotational orientation), a portion 135a of the peripheral flange 135 that is circumferentially aligned with each notch 125 may be axially crimped, peened, or otherwise deformed into mating or interlocking engagement with the aligned notches 125 (FIG. 3), using a suitable tool (e.g., a pneumatic or hydraulic press or hammer, or a manually operated hammer, pliers or other such tool), thereby securing the end adapter 130 in the desired position. While the illustrated embodiment includes two notches 125 in the body end port 122, in other embodiments, the body may be provided with any number of notches (e.g., one, or three or more) for interlocking engagement with any number of deformed portions of the end adapter flange.

Figure 4:
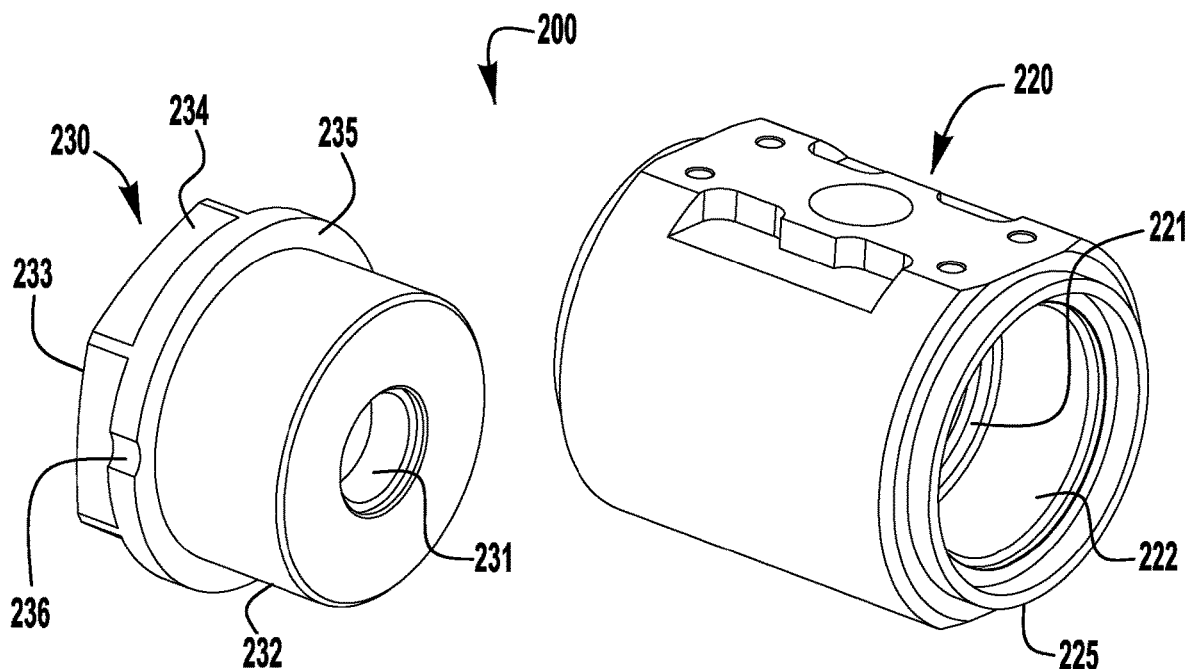
FIG. 4 is an exploded perspective view of a body and end adapter of another fluid device assembly, according to another exemplary embodiment of the present disclosure.
Figure 5:
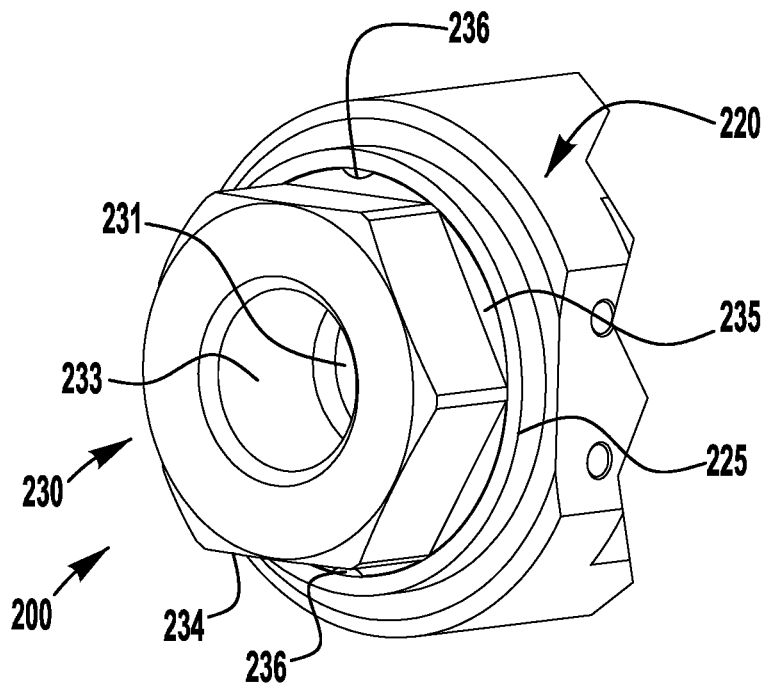
FIG. 5 is a perspective view of the assembly of FIG. 4, shown in a fully assembled condition.
Figure 6:
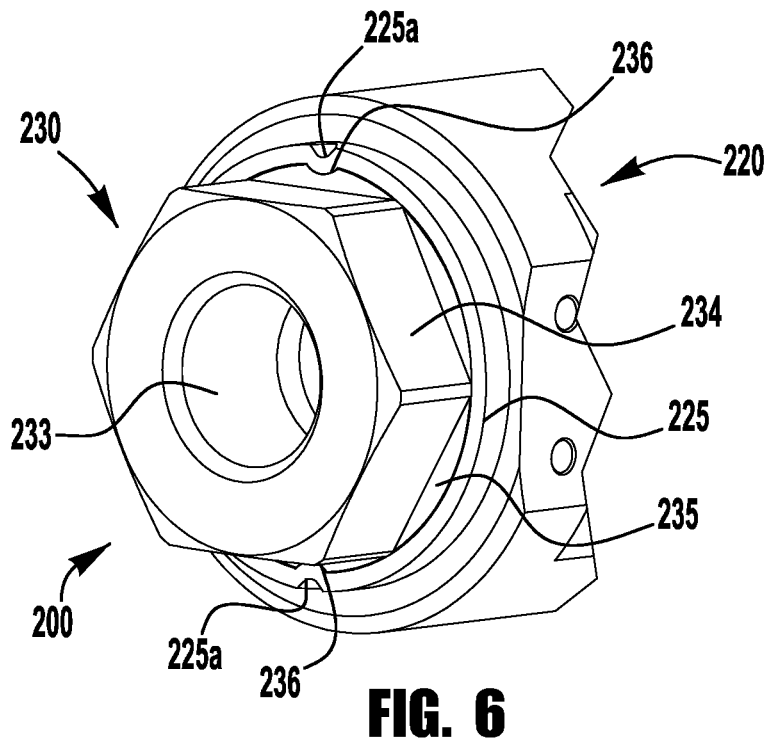
FIG. 6 is a cross-sectional view of the assembly of FIG. 4; shown in a fully assembled and mechanically locked condition.

FIGS. 4-6 illustrate another exemplary assembly 200 including a body 220 and an end adapter 230. Similar to the assembly 100 of FIGS. 1 and 2, the body 220 includes an internal cavity 221 and a female threaded end port 222, and the end adapter 230 includes a male threaded end screw 232, an end connector 233, and an internal passage 231 extending from the end screw 232 to the end connector 233. The end adapter 230 includes radially extending recesses or notches 236 on an outer periphery of a flange portion 235 extending radially outward of a hex-shaped exterior portion 234 of the end adapter, and the body 220 includes an axially extending peripheral collar or flange 225, extending axially outward from the end port 222, and sized to receive and axially align with the end adapter flange portion 235 when the end adapter 230 is assembled with the body 220 (FIG. 5). When the end adapter 230 is tightened with the body 220 to a desired condition (e.g., desired torque, number of turns, and/or rotational orientation), a portion 225a of the peripheral flange 225 that is circumferentially aligned with each notch 236 may be radially crimped, peened, or otherwise deformed into mating or interlocking engagement with the aligned notches 236 (FIG. 6), using a suitable tool (e.g., a pneumatic or hydraulic press or hammer, or a manually operated hammer, pliers or other such tool), thereby securing the end adapter 230 in the desired position. While the notches may be provided in a variety of shapes and sizes, in the illustrated embodiment, the notches 236 each form a half moon shape sized to closely receive a crimped portion of the flange 225 sufficient to securely lock the end adapter 230 in a desired rotational position. Also, while the illustrated embodiment includes two notches 236 in the end adapter flange 235, in other embodiments, the end adapter flange may be provided with any number of notches (e.g., one, or three or more) for interlocking engagement with any number of deformed portions of the body flange.

Figure 7:
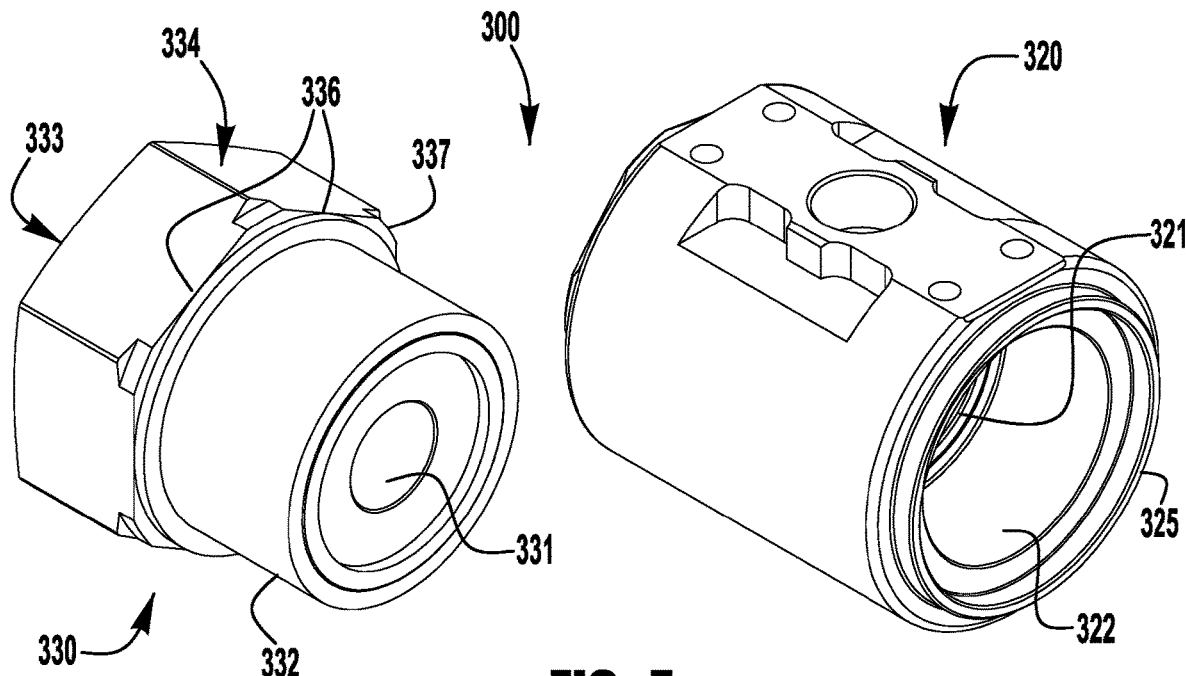
FIG. 7 is an exploded perspective view of a body and end adapter of another fluid device assembly, according to another exemplary embodiment of the present disclosure.
Figure 8:
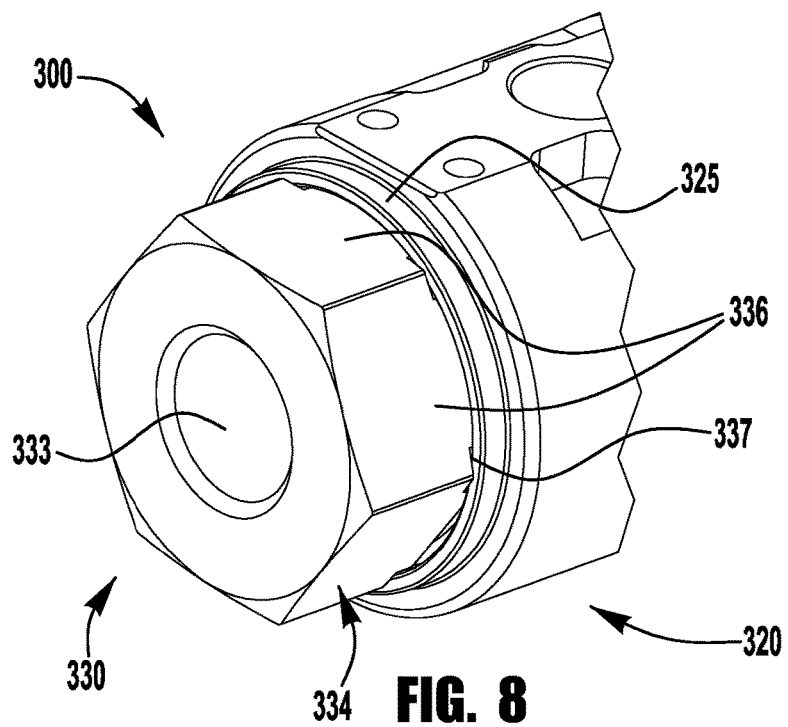
FIG. 8 is a perspective view of the assembly of FIG. 7, shown in a fully assembled condition.
Figure 9:
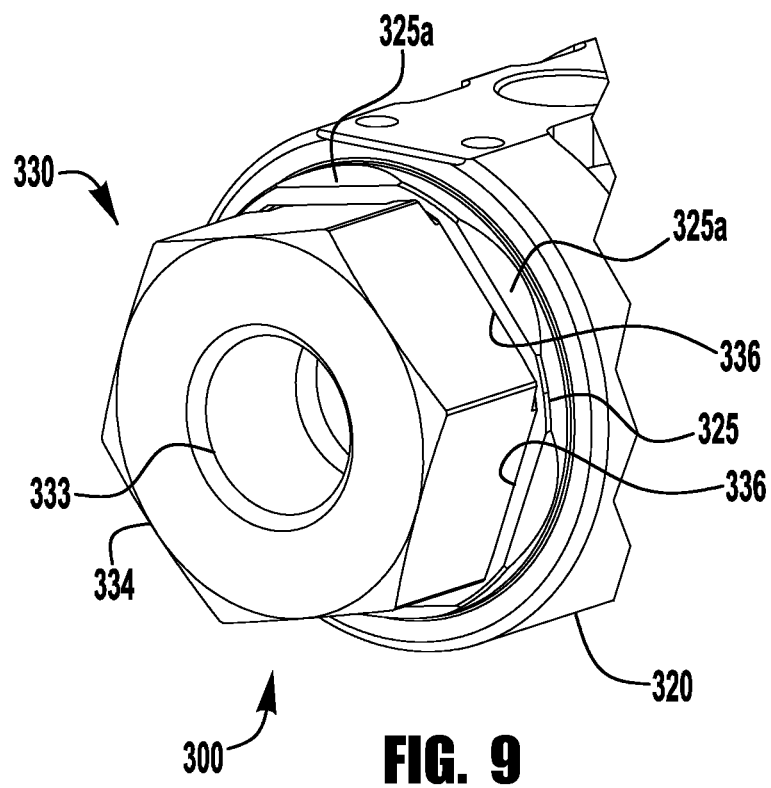
FIG. 9 is a cross-sectional view of the assembly of FIG. 7; shown in a fully assembled and mechanically locked condition.

FIGS. 7-9 illustrate another exemplary assembly 300 including a body 320 and an end adapter 330. Similar to the assemblies 100, 200 of FIGS. 1-6, the body 320 includes an internal cavity 321 and a female threaded end port 322, and the end adapter 330 includes a male threaded end screw 332, an end connector 333, and an internal passage 331 extending from the end screw 332 to the end connector 333. The end adapter 330 includes recesses 336 defined by the hex flats of a hex-shaped exterior portion 334 of the end adapter, and the body 320 includes an axially extending peripheral collar or flange 325 sized to receive and axially align with the hex-shaped exterior portion 334 when the end adapter 330 is assembled with the body 320 (FIG. 5). In the illustrated embodiment, the hex-shaped exterior portion 334 includes a necked-down axially inner portion 337, with edges of the hex-shaped portion 334 are removed or omitted to facilitate receipt of the hex-shaped exterior portion 334 within the body flange or collar 325. When the end adapter 330 is tightened with the body 320 to a desired condition (e.g., desired torque, number of turns, and/or rotational orientation), one or more portions 325a of the peripheral flange 325 that are circumferentially aligned with the recess-defining flats 336 may be radially crimped, peened, or otherwise deformed into mating or interlocking engagement with the aligned flats 336 (FIG. 9), using a suitable tool (e.g., conventional tools such as crescent, pipe or open end wrenches), thereby securing the end adapter 330 in the desired position. In the illustrated embodiment, the entire peripheral flange 325 may be deformed radially inward for interlocking engagement with all of the hex flats 336. In other embodiments, only a portion of the peripheral flange may be deformed into interlocking engagement with only a portion of the hex flats (e.g., one or two of the hex flats). For example, opposite side portions of the flange may be crimped radially inward for interlocking engagement with two hex flats on opposite sides of the hex-shaped exterior portion of the end adapter.

The fluid control assemblies described herein may be provided in a variety of materials, including, for example, metals, such as, for example, one or more of stainless steel, carbon steel, and brass.

The inventive aspects and concepts have been described with reference to the exemplary embodiments. Modification and alterations will occur to others upon a reading and understanding of this specification. It is intended to include all such modifications and alterations insofar as they come within the scope of the appended claims or the equivalents thereof.

The invention claimed is:

1. A fluid control assembly comprising:
a body including a female threaded end port; and
an end adapter including a male threaded end screw threadably assembled with the female threaded end port, an end connector, and an internal passage extending axially from the end connector to the end screw;
wherein the end adapter includes a plurality of hex flats defining a plurality of outer peripheral recesses extending axially and radially outward from a necked down portion, and
the body includes an axially extending collar, extending axially outward from an end face of the body end port and over the necked down portion of the end adapter, with edge portions of the plurality of hex flats radially overlapping the collar;
wherein first and second portions of the axially extending collar in circumferential alignment with first and second ones of the plurality of outer peripheral recesses are deformed into interlocking engagement with the first and second outer peripheral recesses to rotationally secure the end adapter with respect to the body.

2. The assembly of claim 1, wherein the body comprises a valve body.

3. The assembly of claim 1, wherein the body and end adapter comprise at least one of stainless steel, carbon steel, and brass.

4. The assembly of claim 1, wherein the end connector of the end adapter comprises one of: a female threaded pipe fitting, a male threaded pipe fitting, a tube fitting, a weld tube stub, and a gasketed connector.

5. A method of making a mechanically locked threaded connection, the method comprising:
providing a body including a female threaded end port and an end adapter including a male threaded end screw and an end connector, wherein the end adapter includes a plurality of hex flats defining a plurality of recesses extending axially and radially outward from a necked down portion, and the body includes an axially extending collar, extending axially outward from an end face of the body end port;
threadably assembling the male threaded end screw with the female threaded end port, such that the collar extends over the necked down portion of the end adapter, with edge portions of the plurality of hex flats radially overlapping the collar; and
deforming first and second portions of the axially extending collar into interlocking engagement with corresponding first and second ones of the plurality of recesses to rotationally secure the end adapter with respect to the body.

6. The assembly of claim 1, wherein the necked down portion of the end adapter is defined by omission of edge portions of the plurality of hex flats.

7. The assembly of claim 1, wherein the first and second portions of the axially extending collar are deformed radially inward against corresponding circumferentially aligned hex flats of the plurality of hex flats.

8. The assembly of claim 1, wherein the first and second ones of the plurality of recesses are disposed on opposite sides of the end adapter.

9. The assembly of claim 1, wherein the axially extending collar is deformed radially inward against all of the plurality of hex flats.

10. The method of claim 5, wherein the body comprises a valve body.

11. The method of claim 5, wherein the body and end adapter comprise at least one of stainless steel, carbon steel, and brass.

12. The method of claim 5, wherein the end connector of the end adapter comprises one of: a female threaded pipe fitting, a male threaded pipe fitting, a tube fitting, a weld tube stub, and a gasketed connector.

13. The method of claim 5, wherein the necked down portion of the end adapter is defined by omission of edge portions of the plurality of hex flats.

14. The method of claim 5, wherein deforming the first and second portions of the axially extending collar comprises deforming the first and second portions of the axially extending collar radially inward against corresponding circumferentially aligned hex flats of the plurality of hex flats.

15. The method of claim 5, wherein the first and second ones of the plurality of recesses are disposed on opposite sides of the end adapter.

16. The method of claim 5, wherein deforming the first and second portions of the axially extending collar comprises deforming the axially extending collar radially inward against all of the plurality of hex flats.

* * * * *